(12) United States Patent
Yakabe et al.

(10) Patent No.: US 6,805,087 B2
(45) Date of Patent: Oct. 19, 2004

(54) VARIABLE AIR INTAKE MECHANISM OF ENGINE

(75) Inventors: Yoshinori Yakabe, Nagoya (JP); Hidetoshi Ono, Kyoto (JP); Atsuhito Ito, Ozazaki (JP); Katumi Ezaki, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/712,721

(22) Filed: Nov. 13, 2003

(65) Prior Publication Data

US 2004/0144353 A1 Jul. 29, 2004

(30) Foreign Application Priority Data

Nov. 13, 2002 (JP) ........................................ 2002-329075

(51) Int. Cl.$^7$ ............................................... F02M 35/10
(52) U.S. Cl. ............................ 123/184.25; 123/184.26; 123/184.51
(58) Field of Search ........................ 123/184.1, 184.25, 123/184.26, 184.27, 184.29, 184.51

(56) References Cited

U.S. PATENT DOCUMENTS 6,557,511 B2 * 5/2003 Rutschmann et al. .. 123/184.53
6,619,267 B1 * 9/2003 Pao ............................ 123/481

\* cited by examiner

Primary Examiner—Bibhu Mohanty
(74) Attorney, Agent, or Firm—Rossi & Associates

(57) ABSTRACT

An air intake structure of an engine has a first intake air passage and a second intake air passage provided independently and having downstream end portions branched into a plurality of intake ducts connected to a plurality of cylinders of the engine. The neighborhood of the downstream end portion of the first intake air passage and the neighborhood of the down stream end portion of the second intake air passage can be brought into communication by a first communication element. The first intake air passage and the second intake air passage are rendered communicable by a second communication element upstream from the first communication element in the flowing direction of intake air. The first communication element and the second communication element are controlled in accordance with the operating state of the engine.

12 Claims, 5 Drawing Sheets

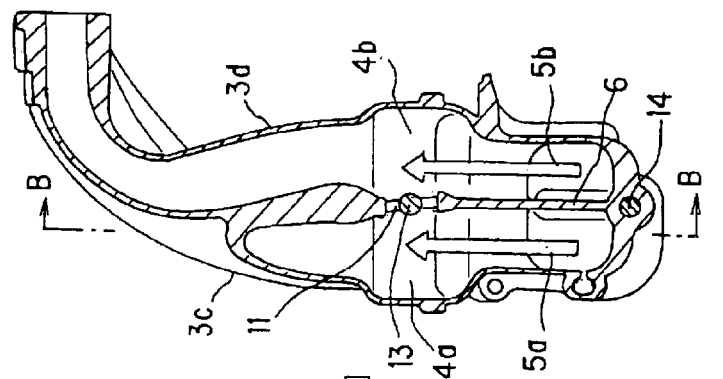
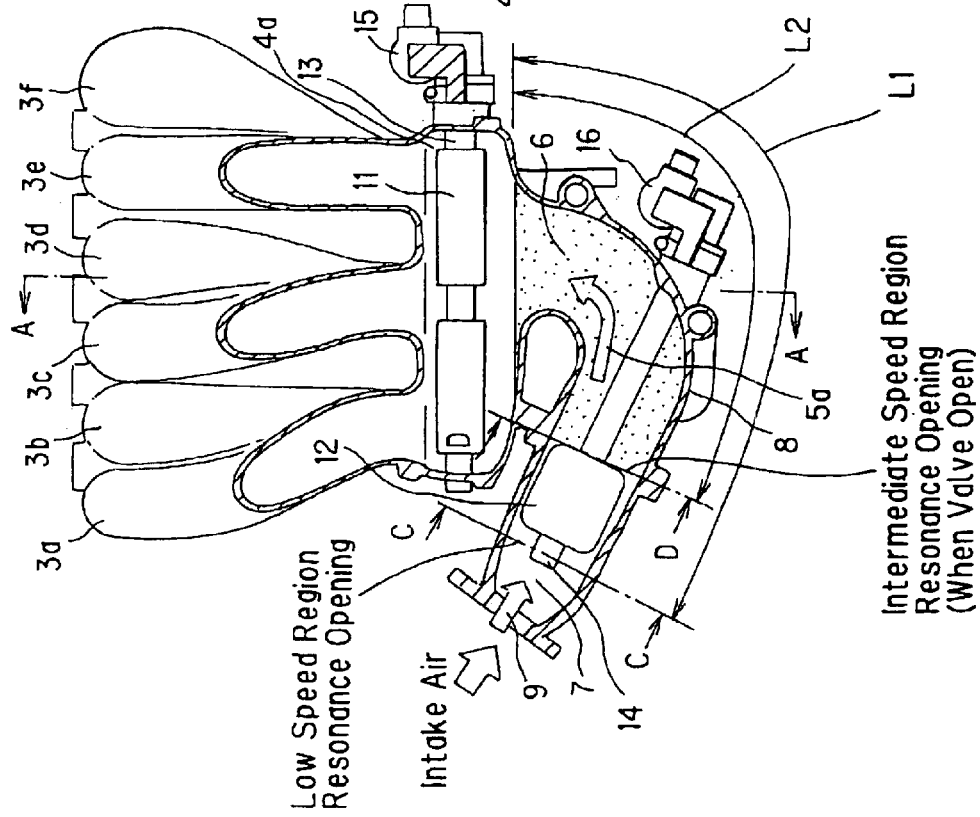

VARIABLE AIR INTAKE MECHANISM OF ENGINE

CROSS-REFERENCE TO THE RELATED ART

This application incorporates by reference the subject matter of Application No. 2002-329075, filed in Japan on Nov. 13, 2002, on which a priority claim is based under 35 U.S.C. §119(a).

BACKGROUND OF THE INVENTION (1) Field of the Invention

This invention relates to an air intake structure of an engine.

(2) Description of the Related Art

As a technique for increasing volumetric efficiency in an air intake structure of an engine, a variable intake structure is known which uses a resonator effect in the low revolution speed region of the engine and uses an inertia effect in the high revolution speed region of the engine.

In the case of a variable intake structure of a V type 6-cylindered engine, for example, 6 intake pipes corresponding to the respective cylinders are gathered, in groups of 3 intake pipes, on an upstream side to form 2 ports, and these two ports are constituted independently as far as the neighborhood of a throttle body with the use of a partition structure. By appropriately setting the length and thickness of each port as an intake air passage, volumetric efficiency is increased with the aid of a resonator effect. A selector valve capable of establishing communication between these two ports is provided at a site of the independently constituted two ports which is immediately before their branching into a plurality of intake pipes in correspondence with the respective cylinders. The two ports, rendered independent, are brought into communication at this site, whereby intake air pulsation is counteracted to obtain an inertia effect. The selector valve is opened or closed according to the engine revolution speed. That is, the two ports are brought into a communication state or a non-communication state, whereby better volumetric efficiency can be obtained when the engine revolution speed is in a low revolution speed region and a high revolution speed region. This can be seen in detail from FIG. 5. Assume, here, that the engine revolution speed is close to the point of contact between a graph, which shows the relationship between the engine revolution speed and the volumetric efficiency when the selector valve is closed, and a graph, which shows the relationship between the engine revolution speed and the volumetric efficiency when the selector valve is open. If, at this time, the selector valve is controlled so as to become open from the closed state, a better volumetric efficiency can be obtained because of the resonator effect of intake air in the low engine revolution speed region and the inertia effect of intake air in the high engine revolution speed region.

In the foregoing variable intake structure, however, when the engine revolution speed is in a revolution speed region where the selector valve is switched from the closed state to the open state, the volumetric efficiency markedly drops (see FIG. 5). That is, the volumetric efficiency due to the resonator effect in the closed state of the selector valve, and the volumetric efficiency due to the inertia effect in the open state of the selector valve both decrease in the engine revolution speed region where the selector valve is switched (i.e. intermediate revolution speed region). Thus, a drop portion occurs between the peaks of the volumetric efficiencies ascribed to the respective effects. This poses the problem of difficulty in increasing volumetric efficiency in this intermediate revolution speed region.

Among techniques for preventing such a drop in volumetric efficiency is the technique disclosed in Japanese Patent Publication No. 1995-39812. According to this technique, in a V type 6-cylindered internal combustion engine, an opening/closing valve 23 is controlled so as to be closed in the low speed operation region of the engine to constitute two resonate charging systems; the opening/closing valve 23 is controlled so as to open, and simultaneously pipe length selector valves 38l, 38r are controlled so as to be closed, in the intermediate speed operation region of the engine to constitute an inertia charging system of a large pipe length where resonance chambers Cr-l, Cr-r form ends open to the air; and the opening/closing valve 23 and the pipe length selector valves 38l, 38r are both controlled so as to open in the high speed operation region of the engine to bring intermediate portions of distribution pipes $35_1$ to $35_6$ into communication with a pipe length changeover chamber Cc, which is a substantial end open to the air, thereby constituting an inertia charging system of a small pipe length. In this manner, the resonate charging system is constituted in the low speed operation region, and the inertia charging systems of large and small pipe lengths are constituted in the intermediate and high speed operation regions, respectively. By so doing, the volumetric efficiency is increased over the broad operating region of the engine (see patent document 1, FIG. 1).

With the technology described in the above publication, however, the inertia charging system is constituted in the intermediate and high speed operation regions of the engine. This has presented the problem that the structure of the entire air intake system is very complicated.

SUMMARY OF THE INVENTION

The present invention has been accomplished in the light of the above-mentioned problems. It is the object of the invention to provide an air intake structure of an internal combustion engine, which has a relatively simple configuration and has a satisfactory volumetric efficiency in the broad operation region of the engine.

The air intake structure of an engine according to the present invention comprises a first intake air passage and a second intake air passage formed by branching of an intake air passage disposed downstream from a throttle valve; a plurality of intake ducts branched from a downstream end portion of the first intake air passage and a downstream end portion of the second intake air passage and having a downstream side connected to a plurality of cylinders provided in the engine; a first communication element capable of establishing communication between the neighborhood of the downstream end portion of the first intake air passage and the neighborhood of the downstream end portion of the second intake air passage; and a control element for controlling the first communication element in accordance with the operating state of the engine, the air intake structure further comprising a second communication element which, upstream from the first communication element in the flowing direction of intake air, can bring the first intake air passage and the second intake air passage into communication, and the control element being adapted to control the first communication element and the second communication element in accordance with the operating state of the engine.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 2A and 2B are views showing details of the air intake structure of the engine illustrated in FIG. 1, in the form of sectional views of the air intake structure of a V type 6-cylindered engine as an example of an embodiment according to the present invention, FIG. 2A being the sectional view of a variable intake structure of the engine viewed from above, FIG. 2B being the sectional view of the variable intake structure viewed sideways, FIG. 2A corresponding to the sectional view taken along arrowed line B—B of FIG. 2B, and FIG. 2B corresponding to the sectional view taken along arrowed line A—A of FIG. 2A;

DETAILED DESCRIPTION OF THE INVENTION

Embodiments of the air intake structure of an engine, which have embodied the present invention, will now be described with reference to the accompanying drawings.

Figure 1:
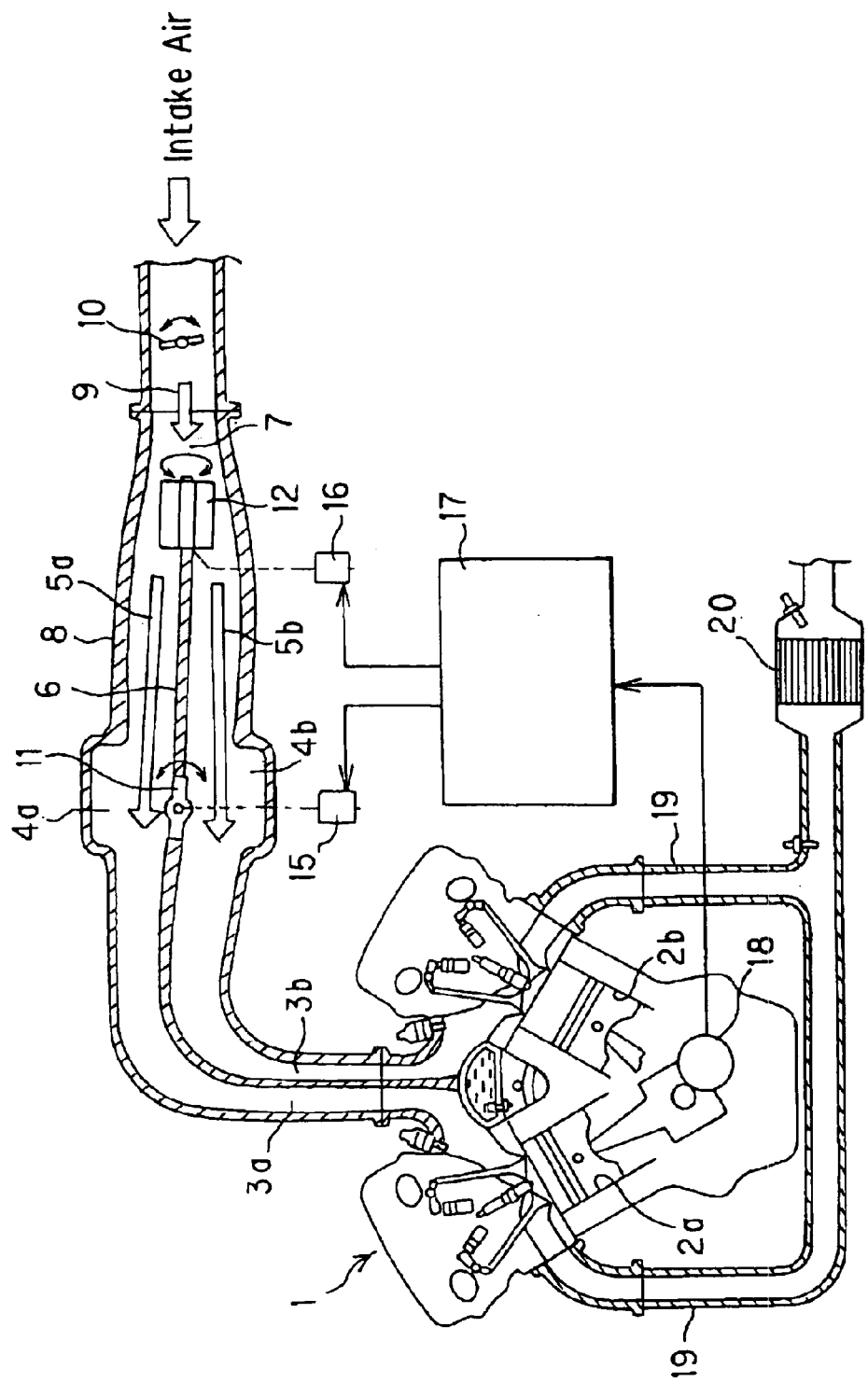
FIG. 1 is a schematic view of an engine having an air intake structure of the engine according to the present invention.

In the air intake structure of an engine according to the present invention, as shown in FIGS. 1 and 2A, 2B, an intake air passage 9, provided downstream from a throttle valve 10, is branched on an upstream side into a first intake air passage 5a and a second intake air passage 5b, and further branched into a plurality of intake pipes 3a to 3f at a downstream end portion 4a of the first intake air passage 5a and a downstream end portion 4b of the second intake air passage 5b, and downstream end portions of the plurality of intake pipes 3a to 3f are connected to an engine 1 in correspondence with a plurality of cylinders 2a to 2f. In a V type 6-cylindered engine, the downstream end portion 4a of the first intake air passage 5a branched off on the upstream side of the intake air passage 9 is branched into the intake pipes 3a, 3c, 3e (first intake pipes), and the downstream end portions of the intake pipes 3a, 3c, 3e are connected to the engine 1 in correspondence with the cylinders 2a, 2c, 2e provided in one of banks. Whereas the downstream end portion 4b of the second intake air passage 5b branched off on the upstream side of the intake air passage 9 is branched into the intake pipes 3b, 3d, 3f (second intake pipes), and the downstream end portions of the intake pipes 3b, 3d, 3f are connected to the engine 1 in correspondence with the cylinders 2b, 2d, 2f provided in the other bank.

The first intake air passage 5a and the second intake air passage 5b are separated by a partition portion 6 over a range ranging from a bifurcation of the intake air passage 9, which is located downstream from the throttle valve 10, to their respective downstream end portions 4a, 4b to form independent intake air passages. The intake pipes 3a to 3f, the first intake air passage 5a, and the second intake air passage 5b are set at appropriate lengths and appropriate intake sectional areas for obtaining an enhanced effect when increasing the volumetric efficiency of intake air by a resonator effect.

The air intake structure of the engine according to the present invention also has a first selector valve 11 as a first communication element capable of establishing communication between the downstream end portion 4a of the first intake air passage 5a and the downstream end portion 4b of the second intake air passage 5b, the first selector valve 11 serving as a member for performing variable control of intake air. The air intake structure further has a second selector valve 12 as a second communication element, which is capable of bringing the first intake air passage 5a and the second intake air passage 5b into communication, on a side upstream from the first selector valve 11 in the flowing direction of intake air, concretely, at an upstream end portion of the partition portion 6. The first selector valve 11 and the second selector valve 12 have partition plates mounted on shafts 13 and 14 which are rotated when driven by motors 15 and 16. The shafts 13, 14 and the respective partition plates are rotated by the motors 15, 16 to bring the respective selector valves into an open state or a closed state, thereby bring the first intake air passage 5a and the second intake air passage 5b into or out of communication. The shafts 13 and 14 may be adapted to be driven by vacuum actuators. The selector valves 11 and 12 may each be constituted as a slide mechanism having a slidable partition plate so that when the partition plate is slid in the lengthwise direction of the partition portion 6, the first intake air passage 5a and the second intake air passage 5b are brought into or out of communication.

In the partition portion 6, there is formed an opening where the first selector valve 11 is disposed and which is opened and closed by the partition plate. This opening is set at a size such that when the first selector valve 11 is in an open state, namely, when the first intake air passage 5a and the second intake air passage 5l b are in communication, a higher inertia effect is obtained. The first selector valve 11 is also set at a size in conformity with the size of this opening, and is constituted such that when the first selector valve 11 enters into a closed state, the first intake air passage 5a and the second intake air passage 5b are cut off from communication, becoming independent intake air passages. The shaft 14 of the second selector valve 12 is installed within the partition plate 6, with the lengthwise direction of the shaft 14 being nearly the same as the streamline direction of intake air, to avoid intake resistance to the first intake air passage 5a and the second intake air passage 5b. Thus, a bank portion 8, which defines the first intake air passage 5a and the second intake air passage 5b, is formed as a bent pipe so that the shaft 14 and the motor 16 are easy to dispose.

To tune the peak of the volumetric efficiency, the intake sectional area of an intake downstream side of the second selector valve 12, i.e. an intermediate speed region resonance opening (line D—D), is set to be larger than the intake sectional area of an intake upstream side of the second selector valve 12, i.e. a low speed region resonance opening (line C—C). A detailed explanation for this will be offered later in FIG. 3.

The motors 15 and 16 for driving the first selector valve 11 and the second selector valve 12 to be open or closed are controlled by an engine ECU 17 which controls the engine 1 globally. The engine ECU 17 functions as a control element for increasing the volumetric efficiency of each cylinder $2a, 2b$ . . . The engine ECU 17 controls switching of the first selector valve 11 and the second selector valve 12 to become open or closed, according to the value of input from a tachometer 18 provided in the engine 1 for measuring the number of revolutions of the engine 1, that is, according to the revolution speed of the engine 1.

Concretely, during the low speed operation of the engine 1, namely, when the revolution speed of the engine 1 is in a low revolution speed region, the first selector valve 11 and the second selector valve 12 are both closed to bring the first intake air passage $5a$ and the second intake air passage $5b$ into a non-communication state both on the upstream side and the downstream side. Thus, the first intake air passage $5a$ and the second intake air passage $5b$ are separated by the second selector valve 12, the partition portion 6, and the first selector valve 11. As a result, the length of the partition between the first intake air passage $5a$ and the second intake air passage $5b$ is a low speed region partition length L1 as shown in FIG. 2A, and a resonator effect of resonating the intake pulsation of the intake pipes $3a, 3b$ . . . is produced, whereby the volumetric efficiency of the cylinders $2a, 2b$ . . . is increased.

During the intermediate speed operation of the engine 1, namely, when the revolution speed of the engine 1 is in an intermediate revolution speed region, the first selector valve 11 is closed and the second selector valve 12 is opened to bring the first intake air passage $5a$ and the second intake air passage $5b$ into a communication state on the upstream side. Thus, the first intake air passage $5a$ and the second intake air passage $5b$ are separated by the partition portion 6 and the first selector valve 11. As a result, the length of the partition between the first intake air passage $5a$ and the second intake air passage $5b$ is an intermediate speed region partition length L2 as shown in FIG. 2A, and the volumetric efficiency of the cylinders $2a, 2b$ . . . is increased by the resonator effect.

During the high speed operation of the engine 1, namely, when the revolution speed of the engine 1 is in a high revolution speed region, the first selector valve 11 and the second selector valve 12 are both placed in an open state to bring the first intake air passage $5a$ and the second intake air passage $5b$ into a communication state on both of the upstream side and the downstream side. Thus, the downstream end portion $4a$ of the first intake air passage $5a$ and the downstream end portion $4b$ of the second intake air passage $5b$ together form a single large volume, so that the volumetric efficiency of the cylinders $2a, 2b$ . . . is increased by the resonator effect.

Because of the air intake structure of the above-described configuration, intake air with improved volumetric efficiency is mixed with fuel at an appropriate mixture ratio. The air-fuel mixture is guided to the cylinders $2a, 2b$ . . . , combusted there, and then discharged to the atmosphere via an exhaust pipe 19, a catalyst 20, and a muffler, etc. Since air is let in with good volumetric efficiency, an increase in the torque of the engine 1 can be expected in the low speed operation region and the intermediate speed operation region, while an increase in the output of the engine 1 can be expected in the high speed operation region.

Figure 3A:
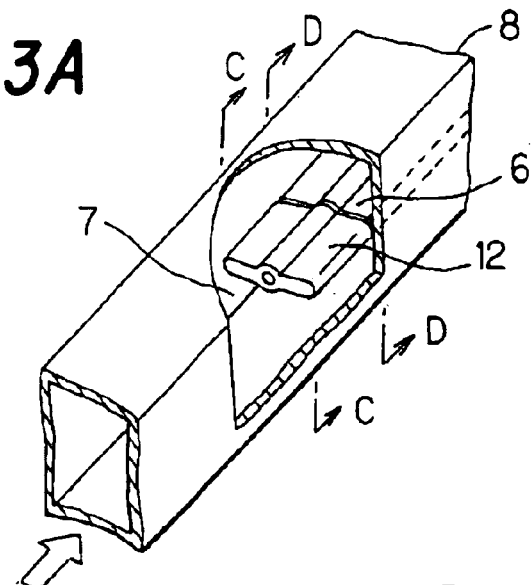
FIGS. 3A to 3D are schematic views showing the neighborhood of a second selector valve 12, FIG. 3A being a perspective view showing the second selector valve 12 in a closed state, FIG. 3B being a perspective view showing the second selector valve 12 in an open state, FIG. 3C being a sectional view taken on arrowed line C—C of FIG. 2A, FIG. 3D being a sectional view taken on arrowed line D—D of FIG. 2A, and FIGS. 3A and 3B being presented, with a bank portion 8 being partly broken away to facilitate understanding of the operating state of the second selector valve 12.

During the low speed operation of the engine 1, the second selector valve 12 is closed, as shown in FIG. 3A, an extension of the partition portion 6 to the intake upstream side is achieved by the second selector valve 12. That is, the first intake air passage $5a$ and the second intake air passage $5b$, which have been branched from the intake air passage 9 and rendered independent, begin at the intake upstream side of the second selector valve 12, i.e. line C—C. The intake sectional area of the first intake air passage $5a$ and the second intake air passage $5b$ comes to be a sectional area $A_N$ at the line C—C shown in FIG. 3C. Hence, volumetric efficiency characteristics having a peak in the low revolution speed region are obtained by the resonator effect complying with the conditions, the long low speed region partition length L1 and the small low speed region resonance opening sectional area $A_N$.

Figure 3B:
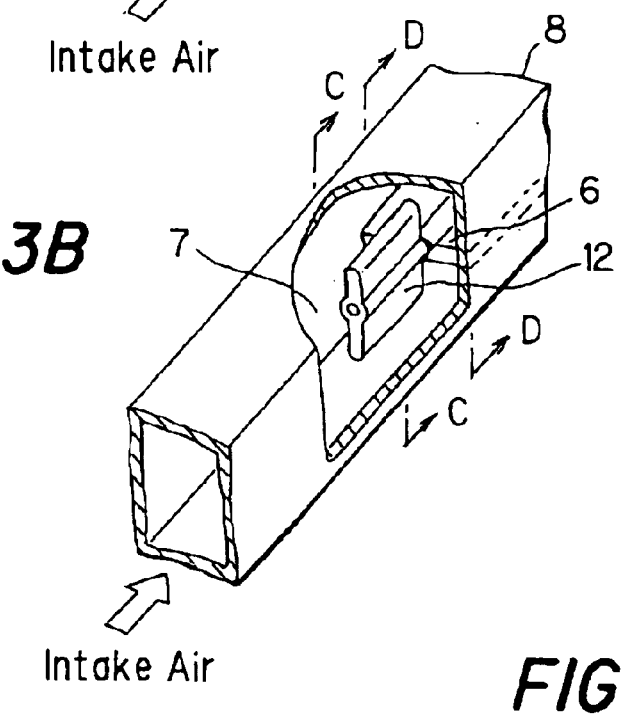
Figures 3C, 3D:
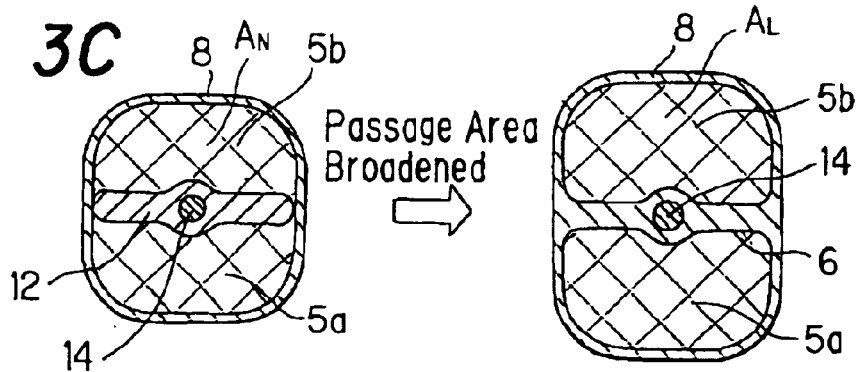

During the intermediate speed operation of the engine 1, the second selector valve 12 is opened, as shown in FIG. 3B. As a result, the second selector valve 12 does not function as a partition any more, while the partition portion 6 and the first selector valve 11 become functional as a partition. That is, the first intake air passage $5a$ and the second intake air passage $5b$, which have been rendered independent of each other, begin at the intake downstream side of the second selector valve 12 (the intake upstream side of the partition portion 6), i.e. line D—D. The intake sectional area of the first intake air passage $5a$ and the second intake air passage $5b$ comes to be a sectional area $A_L$ at the line D—D shown in FIG. 3D. Generally, decreasing the length of the intake air passage (the length of the partition in the present invention), or increasing the passage area changes resonance frequency in the presence of the resonator effect, thereby moving the resonance-synchronized revolution speed of the engine from the low speed operation region to the intermediate speed operation region. Hence, the peak of the volumetric efficiency is shifted from the low revolution speed region to the intermediate revolution speed region by the resonator effect complying with the conditions, the short intermediate speed region partition length L2 and the large intermediate speed region resonance opening sectional area $A_L$, thus obtaining volumetric efficiency characteristics having a peak in the intermediate revolution speed region.

That is, with the air intake structure of the engine according to the present invention, the second selector valve is opened to make the first intake air passage $5a$ and the second intake air passage $5b$ communicate at the upstream side of the partition portion 6, thereby making it possible not only to change the length of the partition between the first intake air passage $5a$ and the second intake air passage $5b$, but also to change the sectional area of the intake opening from the low speed region resonance opening sectional area $A_N$ (the sectional area of the intake upstream end portions of the first intake air passage $5a$ and the second intake air passage $5b$) to the intermediate speed region resonance opening sectional area $A_L$ (the sectional area of the first intake air passage $5a$ and the second intake air passage $5b$ at the downstream site of the second selector valve 12). Thus, the length of the partition can be shortened and, at the same time, the sectional area of the intake opening can be increased. Consequently, tuning of the peaks of the volumetric efficiencies in the low revolution speed region and the intermediate revolution speed region can be set in a broader range, and the degree of freedom to design the tuning improves. These sectional areas need not be changed in terms of magnitude, and the same sectional area may be adopted. In this case, the peaks of the volumetric efficiencies in the low revolution speed region and the intermediate revolution speed region are tuned simply by changing the length of thee partition.

During the high speed operation of the engine 1, moreover, while the second selector valve 12 is kept open, the first selector valve 11 is switched from the closed state to the open state, whereby all the intake pipes $3a$ to $3f$ are gathered at a single location of the downstream end portions of the first intake air passage 5a and the second intake air passage 5b. Thus, the volumetric efficiency of the cylinders 2a to 2f is increased owing to the inertia effect. During the high speed operation of the engine 1, it is permissible to switch the second selector valve 12 from the open state to the closed state, and switch the first selector valve 11 from the closed state to the open state. Preferably, the second selector valve 12 may be kept open even during the high speed operation of the engine 1. In this case, when the engine revolution speed is shifted between the high revolution speed region and the intermediate revolution speed region, it suffices to switch only the first selector valve 11 between the open state and the closed state. As a result, the frequency of operation of the second selector valve 12 can be decreased to improve its durability.

In the air intake structure of the engine according to the present invention, the second selector valve 12 has the following characteristic functions:

(1) A part of the partition for separating the first intake air passage and the second intake air passage is formed by the selector valve (the second selector valve 12), whereby the length of the partition that determines the resonance-synchronized revolution speed can be changed relatively easily by opening or closing the selector valve.

(2) The passage sectional areas of the resonance openings of the upstream end portion and the downstream end portion of the selector valve are changed, whereby different passage sectional areas of the resonance openings can be set by opening or closing the selector valve, and optimal specification for producing the resonator effect can be easily set.

(3) The direction of the rotating shaft of the selector valve is rendered identical with the streamline direction of intake air, whereby intake resistance due to the opening or closing of the selector valve can be decreased.

The actions of each selector valve during control operation are summarized in the following table:

| Revolution speed region | First selector valve | Second selector valve | Action |
|---|---|---|---|
| Low | Closed | Closed | In low revolution speed region, volumetric efficiency peeks because of resonator effect |
| Intermediate | Closed | Open | Decreased length of partition shifts resonance-synchronized revolution speed to intermediate revolution speed region, where volumetric efficiency peaks because of resonator effect |
| High | Open | Open | Inertia effect occurs because of communication between first and second intake air passages |

As shown in Table 1, the first selector valve 11 and the second selector valve 12 in the air intake structure of the engine according to the present invention are controlled in accordance with the revolution speed of the engine, whereby the second selector valve 12 is brought into an open state. By this means, the first intake air passage 5a and the second intake air passage 5b are brought into communication to shorten the length of the partition, thereby shifting the peak of the volumetric efficiency to the resonance-synchronized revolution speed in the intermediate revolution speed region. This procedure can prevent a drop in the volumetric efficiency even in the revolution speed region where the volumetric efficiency has so far dropped, namely, even in the intermediate revolution speed region. Thus, high volumetric efficiency can be obtained in the low revolution speed region through the high revolution speed region by opening or closing the first selector valve 11 and the second selector valve 12.

Figure 4:
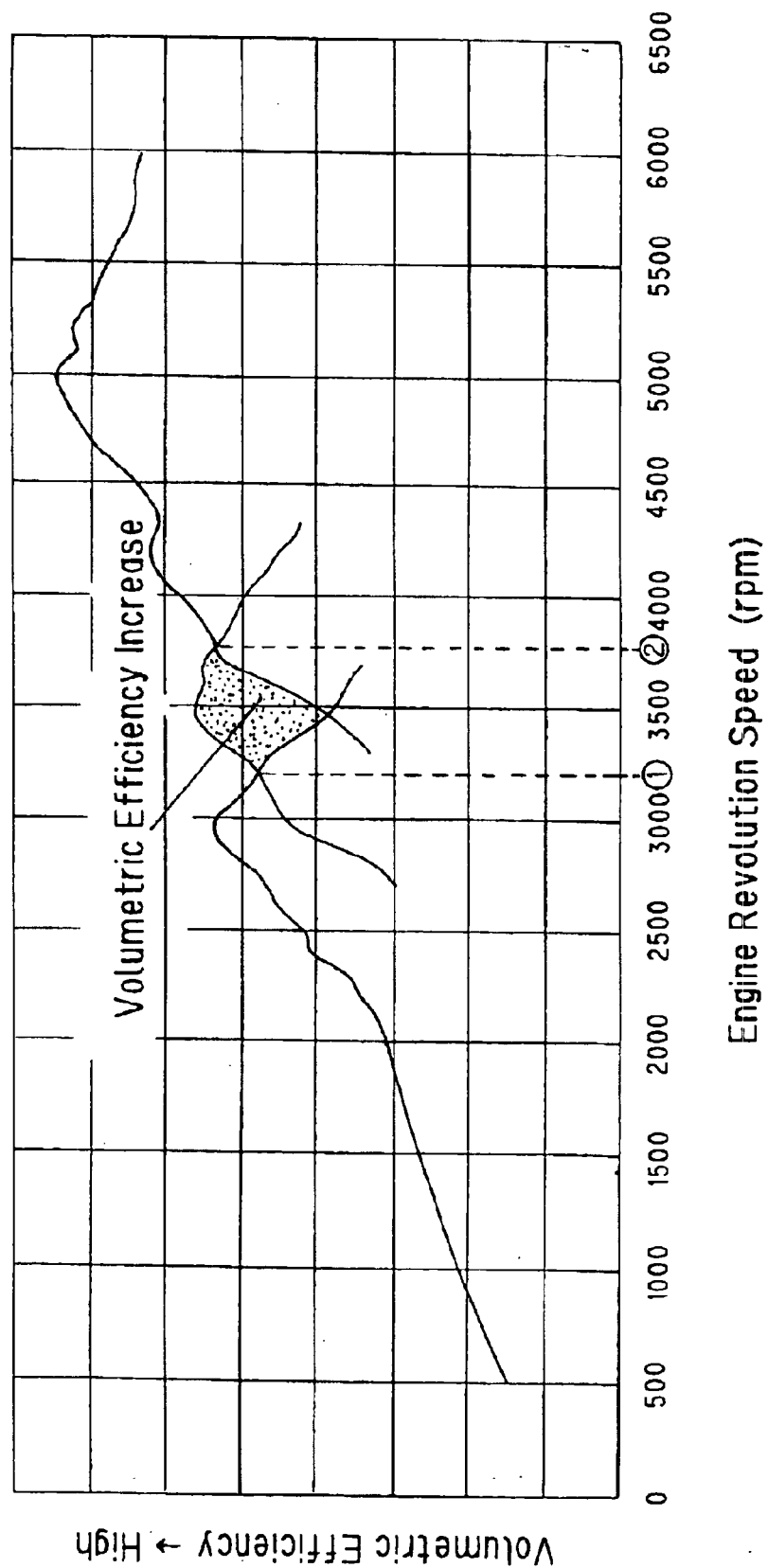
FIG. 4 is a graph showing volumetric efficiency in the air intake structure of the engine according to the present invention.
Figure 5:
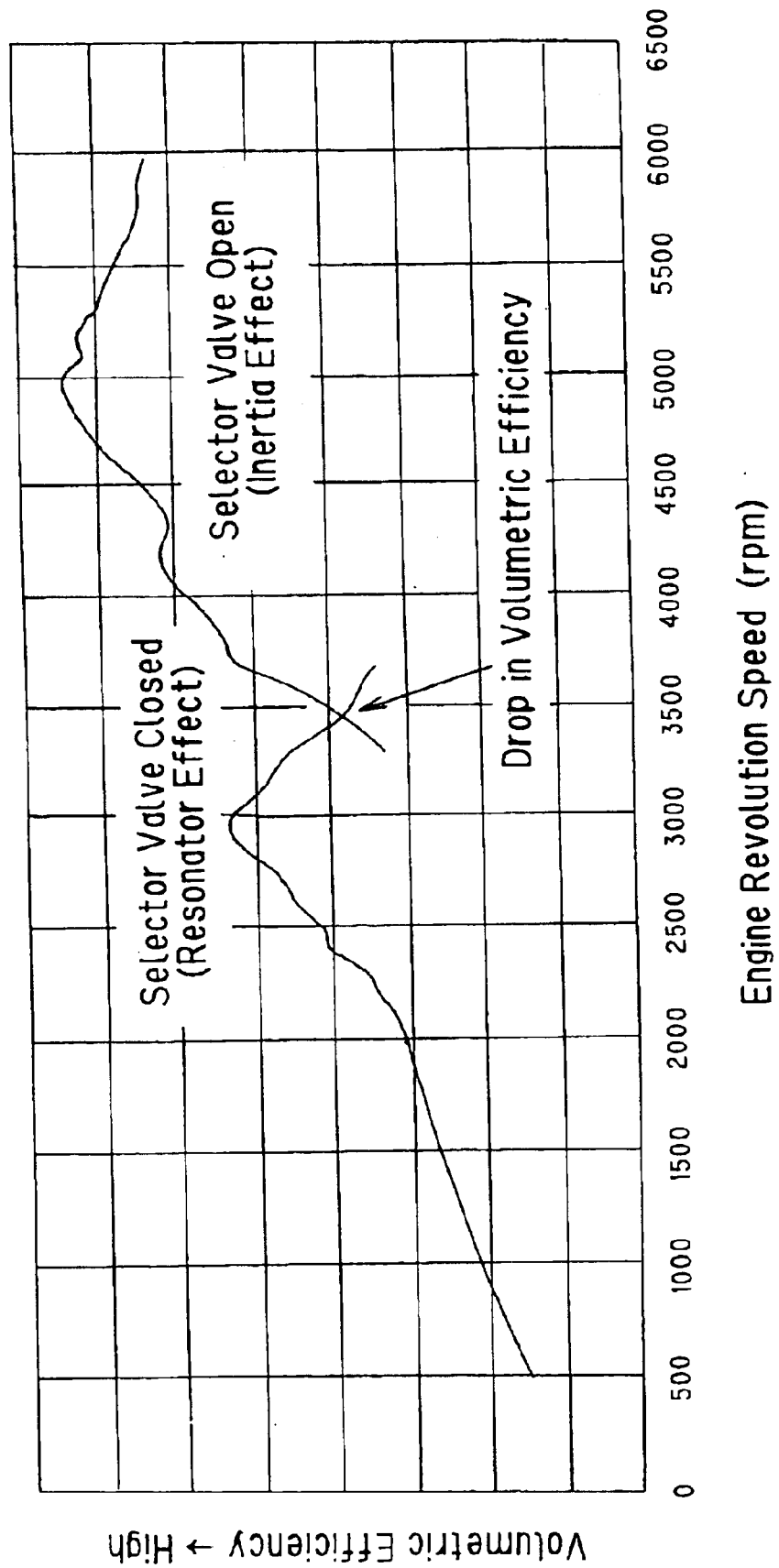
FIG. 5 is a graph showing volumetric efficiency in a conventional air intake structure of an engine.

As seen from FIG. 4, the peaks of three different volumetric efficiency characteristics attributed to the resonator effect and inertia effect with respect to the engine revolution speed can be combined by combining the opening or closing of the first selector valve 11 with the opening or closing of the second selector valve 12. Thus, the conventional marked drop in volumetric efficiency in the intermediate revolution speed region can be suppressed to obtain high volumetric efficiency over the range from the low revolution speed region to the high revolution speed region. At this time, a setting may be made such that the peak of volumetric efficiency in the intermediate revolution speed region occurs at an appropriate engine revolution speed. Further, the respective selector valves may be switched at revolution speeds corresponding to the intersections of the respective volumetric efficiency characteristics (i.e. ①, ② of FIG. 4). By taking these measures, the drop in volumetric efficiency in the intermediate revolution speed region can be minimized.

As noted above, the air intake structure of the engine according to the present invention improves the volumetric efficiency of the respective cylinders by the resonator effect during low speed operation and intermediate speed operation of the engine, and improves the volumetric efficiency of the respective cylinders by the inertia effect during high speed operation of the engine. This makes the structure of the air intake system relatively simple, thus downsizing the engine.

Because of the relatively simple configuration, moreover, the sectional area of the first intake air passage and the second intake air passage when brought into communication by the second communication element can be rendered larger than the sectional area of the first intake air passage and the second intake air passage when brought out of communication by the second communication element. Thus, the range of tuning widens, and the degree of freedom of design heightens.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. An air intake structure of an engine, comprising:
    a first intake air passage and a second intake air passage formed by branching of an intake air passage disposed downstream from a throttle valve;
    a plurality of intake ducts branched from a downstream end portion of said first intake air passage and a downstream end portion of said second intake air passage and having a downstream side connected to a plurality of cylinders provided in said engine;
    a first communication element capable of establishing communication between a neighborhood of said downstream end portion of said first intake air passage and a neighborhood of said downstream end portion of said second intake air passage; and a control element for controlling said first communication element in accordance with an operating state of said engine, said air intake structure further comprising a second communication element which, upstream from said first communication element in a flowing direction of intake air, can bring said first intake air passage and said second intake air passage into communication, and said control element being adapted to control said first communication element and said second communication element in accordance with the operating state of said engine.

2. The air intake structure of the engine according to claim 1, wherein a sectional area of said first intake air passage and said second intake air passage at a site where said second communication element is disposed is rendered larger than a sectional area of upstream end portions of said first intake air passage and said second intake air passage.

3. The air intake structure of the engine according to claim 1, wherein said first intake air passage and said second intake air passage are separated as independent intake air passages by a partition portion.

4. The air intake structure of the engine according to claim 1, wherein said second communication element displaces at least a part of said partition portion to bring said first intake air passage and said second intake air passage into communication.

5. The air intake structure of the engine according to claim 4, wherein said second communication element has a rotatable valve mechanism provided in said partition portion, and brings said first intake air passage and said second intake air passage into communication by rotation of said valve mechanism.

6. The air intake structure of the engine according to claim 5, wherein said valve mechanism comprises a partition plate for unclosing and closing an opening formed in said partition portion, and a rotating shaft disposed rotatably and having said partition plate mounted thereon, and said rotating shaft is installed, with an axial direction thereof being nearly identical with a streamline direction of intake air.

7. The air intake structure of the engine according to claim 4, wherein said second communication element is provided at an upstream end portion of said partition portion.

8. The air intake structure of the engine according to claim 7, wherein when said first intake air passage and said second intake air passage are brought into communication by said second communication element, a partition length of said first intake air passage and said second intake air passage is shortened.

9. The air intake structure of the engine according to claim 7, wherein when said first intake air passage and said second intake air passage are brought into communication by said second communication element, a sectional area of upstream end portions, in the flowing direction of intake air, of said first intake air passage and said second intake air passage is increased.

10. The air intake structure of the engine according to claim 9, wherein an intake sectional area on a downstream side of said second communication element is rendered larger than an intake sectional area on an upstream side of said second communication element.

11. The air intake structure of the engine according to claim 1, wherein said control element brings said first communication element into a non-communication state and also brings said second communication element into a communication state, when a revolution speed of said engine is in an intermediate revolution speed region.

12. The air intake structure of the engine according to claim 11, wherein said control element brings said first communication element and said second communication element into a non-communication state when the revolution speed of said engine is in a low revolution speed region. and brings said first communication element into a communication state when said revolution speed is in a high revolution speed region.

* * * * *